United States Patent [19]

Hoffman et al.

[11] Patent Number: 5,122,742
[45] Date of Patent: Jun. 16, 1992

[54] DETECTION OF STATIC AND/OR QUASI-STATIC MAGNETIC FIELDS IN MAGNETOELASTIC FORCE AND TORQUE TRANSDUCERS

[75] Inventors: Bertil Hoffman, Kolbäck; Sverker Nidmark, Västeras; Jan Palmquist, Västeras; Jarl Sobel, Västeras, all of Sweden

[73] Assignee: Asea Brown Bovert AB, Vasteras, Sweden

[21] Appl. No.: 628,149

[22] Filed: Dec. 17, 1990

[30] Foreign Application Priority Data

Dec. 21, 1989 [SE] Sweden ............... 8904307

[51] Int. Cl.⁵ .................. G01B 7/24; G01R 33/18
[52] U.S. Cl. ................................ 324/209; 324/225
[58] Field of Search ........... 324/209, 225, 207.12; 73/779, 862.36

[56] References Cited

U.S. PATENT DOCUMENTS

| | | | |
|---|---|---|---|
| 3,792,348 | 2/1974 | Rollwitz et al. | 324/209 |
| 3,890,564 | 6/1975 | Watanabe et al. | 324/225 |
| 3,925,725 | 12/1975 | Mogilevsky et al. | 324/225 X |
| 4,506,554 | 3/1985 | Blombvist et al. | 73/862.36 |
| 4,573,012 | 2/1986 | Bisson et al. | 324/225 X |
| 4,716,773 | 1/1988 | Nonomara et al. | 324/209 X |
| 4,752,733 | 6/1988 | Petr et al. | 324/225 |
| 4,760,745 | 8/1988 | Garshelis | 73/862.36 |

Primary Examiner—Kenneth A. Wieder
Assistant Examiner—Warren S. Edmonds
Attorney, Agent, or Firm—Watson, Cole, Grindle & Watson

[57] ABSTRACT

The content of even harmonics is used in both a method and apparatus for the detection of the disturbing static and quasi-static magnetic fields effects in measurement systems using force and torque transducers operating with magnetoelastic effect. The even harmonic content corresponds to the degree of static and/or quasi-static magnetization and is an input signal to a regulator the aid of the direct current in, for example, a separate winding, reduces the static and/or quasi-static magnetization to zero.

9 Claims, 3 Drawing Sheets

DETECTION OF STATIC AND/OR QUASI-STATIC MAGNETIC FIELDS IN MAGNETOELASTIC FORCE AND TORQUE TRANSDUCERS

TECHNICAL FIELD

The present invention relates to a method and a device for detecting and compensating for the effect of static and slowly varying magnetic fields on devices intended to measure mechanical stresses with the aid of the magnetoelastic effect.

BACKGROUND ART, THE PROBLEM

The magnetoelastic effect is a phenomenon whereby the magnetic permeability of a ferromagnetic material is changed when it is subjected to mechanical stresses.

Utilizing the above-mentioned effect for measuring mechanical forces and torques is an idea that arose over fifty years ago. In recent years this idea has attracted an increasingly greater interest.

Above all, the new amorphous materials with their very powerful magnetostriction have contributed to this increase, and also the possibility of using this technique for measuring torques in a contactless and very simple manner.

In addition, transducers based on the magnetoelastic effect are characterized by very high resistance with respect to the external environment and by a high signal power and hence low sensitivity to disturbance.

The design of the above-mentioned transducers varies considerably, but, in principle, the following summary can be made.

A body of a ferromagnetic material is subjected to a periodic magnetization by allowing current to pass through an excitation winding.

The most primitive concept then only measures the inductance in the excitation winding in order thereby to obtain a measure of the magnetic permeability of the material and hence a measure of the mechanical stress.

More sophisticated devices make use of a secondary winding for sensing the time rate of change of the induced magnetic flux.

With the aid of a secondary winding, it is also possible to measure the induced flux in a direction transverse to the magnetization, and in a direction making an angle of 45° with the principal stress direction of the mechanical stresses in the loaded body. This is the case with the known transducers PRESSDUCTOR ® and TORDUCTOR ®.

Another frequently used measuring principle comprises measuring the induced magnetic flux in several regions or measuring zones which are subjected to different mechanical stresses, and then forming the difference between these fluxes.

The most common method is to use two measuring zones, one of which is loaded with tensile stress and the other with compressive stress in the direction of the magnetic field. This is done, for example, in the patent specifications of EP 0089916 and U.S. Pat. No. 4,506,554.

Another method is to measure the difference between the fluxes which are induced in a loaded and an unloaded zone.

Irrespective of which method is used in order to measure the permeability change in the magnetoelastic material, the magnetic hysteresis curve, i.e. the B-H curve which each point in the material completes during a period of the magnetization, will be changed when the material is magnetized by a static field. This, of course, influences the measurement of the induced fluxes and leads to changes both of the measuring signal in an unloaded transducer, i.e. the zero signal, and of the sensitivity of the transducer to load.

If the transducer is magnetized by a static field to such an extent that the ferromagnetic material approaches saturation, the differential permeability and also the sensitivity of the transducer will be very low. However, the influence remains in connection with considerably lower fields.

To reduce the influence of this disturbance, attempts have been made to screen off external magnetic fields. However, screening off static or slowly varying, i.e. quasi-static, magnetic fields has proved to be a difficult technical problem. This problem may be particularly difficult when attempts are made to screen off such magnetic fields in shafts in connection with the measurement of torques.

The problem with static external magnetization may become particuarly serious since static magnetization, by remanence in the transducer material, may give rise to permanent changes in the function of the transducer.

The present invention suggests a method of protecting against the effects of static and/or quasi-static magnetic fields. In addition, the method provides information as to when this protection, in spite of all, is not sufficient and may warn that the transducer does not function satisfactorily, which is very important when the transducer is used in automatic control systems.

SUMMARY OF THE INVENTION

In general terms, as is well known, an arbitrary periodic signal may be represented as a Fourier series, i.e. a sum of sinusoidal signals with different phases but with frequencies which are multiples of one divided by the period of the periodic signal. The lowest of these frequencies is called fundamental frequency or fundamental tone and the others with frequencies which are multiples of this fundamental frequency are called harmonics. Depending on whether the frequency of a harmonic is one time, three times or several times the fundamental frequency, reference is made to the second tone, the third tone, etc., of the periodic signal.

Now, the invention utilizes the fact that the B-H curve, in case of normal magnetization without static fields, is completely symmetrical with respect to reflection through the origin of coordinates.

One way of expressing the above in mathematical terms is that the magnetic flux density, i.e. the B-field, changes signs after half a period, i.e.

$$B(t + T/2) = -B(t) \tag{1}$$

where
B = the magnetic flux density
t = the time
T = the period of the magnetization If the magnetizing field, i.e. the H-field, is purely sinusoidal, the above symmetry means that the Fourier representation of the magnetic flux density as a function of the time will only comprise a fundamental tone and odd harmonics.

A completely linear material gives no harmonics at all, whereas a saturated, non-linear material exhibits a very high content of above all third tones but also of other tones.

When a material has a static magnetization superimposed on the sinusoidal, symmetrical magnetization, however, the symmetry in the B-H curve, indicated by equation (1), is broken. As a result, the Fourier representation of the B-field as a function of the time will also comprise even harmonics.

Accordingly, the invention comprises a method and a device for determining the presence of even harmonics. Measuring the content of these harmonics gives a measure of the degree of static and/or quasi-static magnetization and the measured value may be used as an input signal to a regulator which, with the aid of a direct current, controls this external magnetization to zero.

If the regulator is not able to compensate for the static and/or quasi-static magnetic field, it limits and a warning signal is obtained in a simple manner from the electronics.

A limit as to how rapidly the disturbing quasi-static magnetic field disturbance is allowed to vary is given by the demand that the disturbing magnetization is to change to a small extent during a period of the periodic magnetization.

To manage magnetization in different directions, it is required that the phase position of the second tone relative to the fundamental tone is kept track of. This is most readily managed by phase-sensitive rectification at the frequency of the second tone. This will be described in more detail under the "Description of the Preferred Embodiments".

DESCRIPTION OF THE PREFERRED EMBODIMENTS

Figure 1:
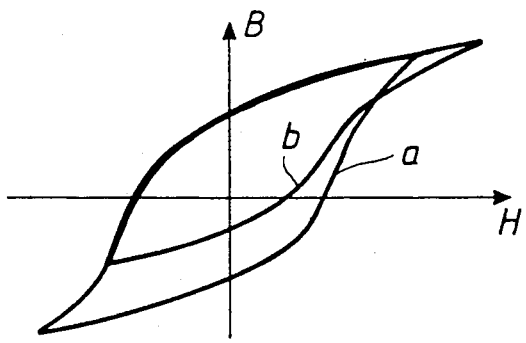
FIG. 1 shows a symmetrical magnetic hysteresis curve as well as a distorted curve when the material is magnetized by a static magnetic field.

The effect of the hysteresis curve and a static magnetization on the harmonic content of the induced magnetic B-field may be studied with reference to FIG. 1, in which curve "a" illustrates the symmetrical magnetic B-H curve which is completed during one period and in which curve "b" shows the distorted curve which is a result of the material, in addition, being magnetized by a static magnetic field. A sinusoidal magnetization according to curve "a" gives a harmonic content in the B-field of 16% of a third tone and 6% of a fifth tone. A sinusoidal magnetization with a static magnetization which produces a curve according to "b" has a second tone in the B-field of 18%.

Figure 2:
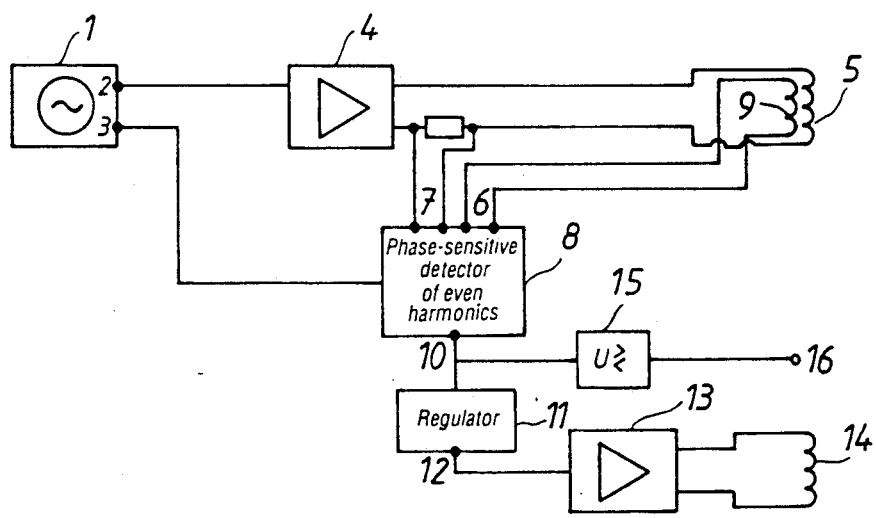
FIG. 2 shows a block diagram of electric equipment according to the invention which manages to detect the external magnetization and control this to zero with the aid of a compensating winding.

A preferred embodiment of the method according to the invention is shown in FIG. 2 in the form of a block diagram for electric equipment which prevents disturbing static or quasi-static magnetic fields from influencing the measurement of force or torque with a magnetoelastic transducer.

The equipment comprises a voltage source which from its outputs 2 and 3 delivers signals which are locked in relation to each other and which have an exact frequency ratio between the signals which is equal to two. The signal from output 2 with the lowest frequency shall be symmetrical around zero, completely free from even harmonics, and is suitably given a pure sine shape, although a pulsewidth-modulated square wave is also, in principle, possible. The signal from the output 3 with double the frequency is also to be symmetrical in such a way that the duration of the half-periods is exactly the same.

The signal from output 2 is connected to a first amplifier 4 which feeds the excitation winding 5 of the transducer. The amplifier may be connected so that the supply voltage is current-controlled according to the signal from output 2, or it may be voltage-controlled according to the same signal.

The above two possibilities of supplying current permit two different methods for detection of even harmonics.

If the exciting current is current-controlled, any even harmonics may be detected in a voltage proportional to the time rate of change of the flux, for example as the induced voltage in a winding parallel to the excitation winding. This voltage is supplied to a detector which, for detection of even harmonics, is also supplied with the signal from the output 3 of the voltage source, i.e. the signal with double the frequency of the supply frequency.

If the magnetization supply to the transducer is voltage-controlled, any even harmonics may be detected in a signal proportional to the supply current, for example in the form of the voltage across a shunt in the supply circuit. This signal is supplied to a detector which, for the detection of even harmonics, is also supplied with the signal from the output 3 of the voltage source, i.e. the signal with double the frequency of the supply frequency.

The above two methods entail that the content of even harmonics will always be superimposed on the fundamental tone. To obtain a better resolution of the phase-sensitive detector, FIG. 2 shows a preferred embodiment which means that both the voltage proportional to the time rate of change of the flux and the voltage proportional to the exciting current are supplied to the detector. The first one of these signals is supplied to input 6 and the second signal is supplied to input 7 on the phase-sensitive detector 8 for detection of even harmonics. The signal 6 is obtained as the induced voltage in a winding 9 parallel to the excitation winding.

A more detailed description of the phase-sensitive detector will be given with reference to the description of FIG. 7.

Now, if the transducer is magnetized by a static and/or quasi-static magnetic field, the B-H curve will be distorted as shown in FIG. 1 in such a way that even harmonics arise. These harmonics have a definite phase position in relation to the periodic magnetization. Since the detection takes place in a phase-sensitive manner, various directions of the static magnetization may be distinguished. The signal from output 10 of the detector may therefore be supplied to a regulator 11 which, with or without a separate compensating winding, generates an oppositely directed static magnetic field and reduces the harmonic content of even harmonics to zero.

In the embodiment described in FIG. 2, the signal from the output 12 of the regulator has been connected to a second amplifier 13 which, in turn, drives a current through a compensating winding 14 which generates the required oppositely directed field.

In order to obtain a warning signal from the electronics if, despite the compensating signal from the regulator and the second amplifier, the supply is still disturbed by superimposed static and/or quasi-static magnetization, the signal from the output 10 of the detector is connected to a level discriminator 15, whose signal from the output 16 constitutes the required warning.

Figure 3:
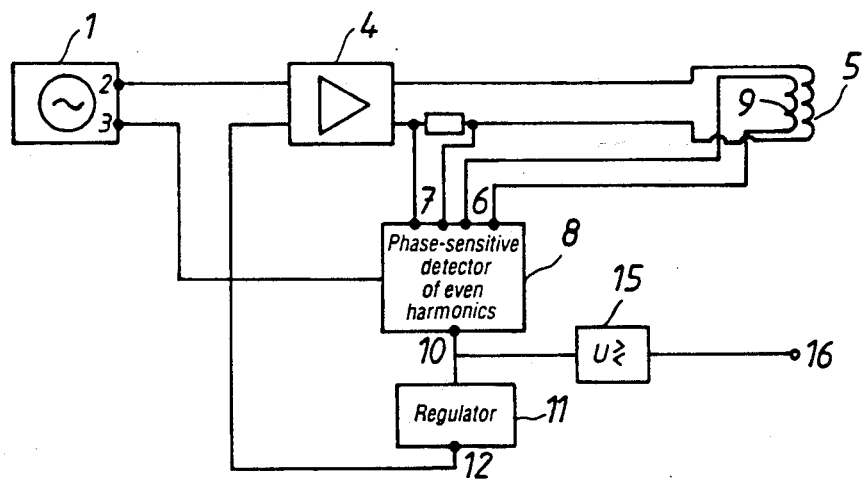
FIG. 3 shows a modified block diagram of electric equipment according to the invention which manages to detect the external magnetization and control this to zero without the help of a compensating winding.

FIG. 3 shows an alternative embodiment of the compensation process itself. The signal from the output 12 of the regulator is added in the first amplifier to the signal from the output 2 of the voltage source. In this way, the periodic magnetization will contain a static and/or quasi-static component which compensates for the external disturbance.

If the cable resistance is low, the signal to the input 6 of the detector, instead of being taken from the compensating winding 9, may be taken directly from the supply voltage of the transducer.

If the transducer is supplied with sinusoidal supply voltage and the output signal from the transducer does not change signs when being subjected to load within the measuring range, it is also, in principle, possible to use the output signal of the transducer as a signal to input 6 of the detector.

For certain transducer types, two or more measuring zones with a measuring winding in each zone are used. These are normally connected in opposition to obtain a difference signal. By making the terminals of all measuring windings available, also the total flux in the transducer may be measured and such a sum signal is then also possible to use as input signal 6 to the phase-sensitive detector.

The regulator 11 is suitably designed as an ordinary PI regulator.

Figure 4:
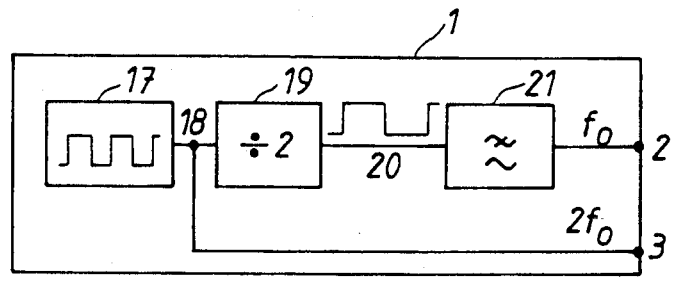
FIGS. 4, 5 and 6 show three different embodiments of the oscillator section in the block diagram according to FIGS. 2 and 3.

FIG. 4 shows a method of realizing the voltage source 1 in FIGS. 2 and 3. The starting-point is a digital frequency generator 17. The output 18 is used directly as the required control signal from the output 3 of the voltage source, and it is also connected to the input of a frequency divider 19. The signal from the output 20 of the frequency divider 19 is thus a square wave with the frequency of half the input signal. Finally, the square wave is filtered in a low-pass filter 21 and is then connected to the output 2 of the voltage source.

Figure 5:
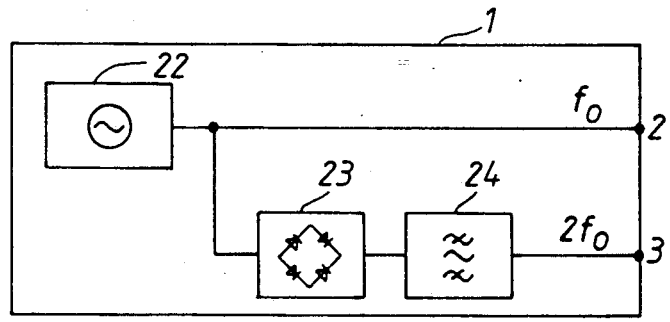

FIG. 5 shows another principle for realizing the voltage source with the aid of a sine generator 22. The output of this generator is connected directly to the output 2 of the voltage source and is also full-wave rectified in a rectifier 23. This creates a signal which contains a frequency component with double the frequency of the sine generator. The rectified signal is then filtered with the bandpass filter 24 and then connected to the output 3 of the voltage source.

Figure 6:
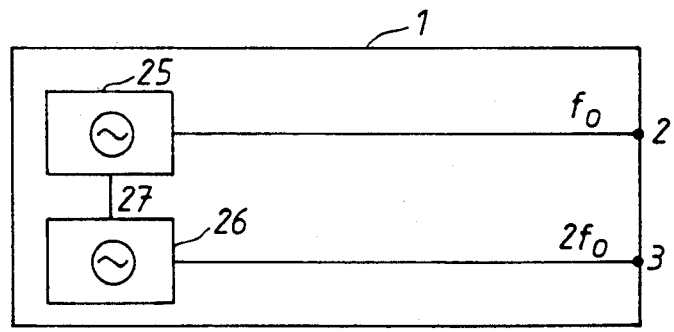

FIG. 6 shows a third alternative in which two sine generators 25 and 26 are used, which are synchronized via a connection 27.

Figure 7:
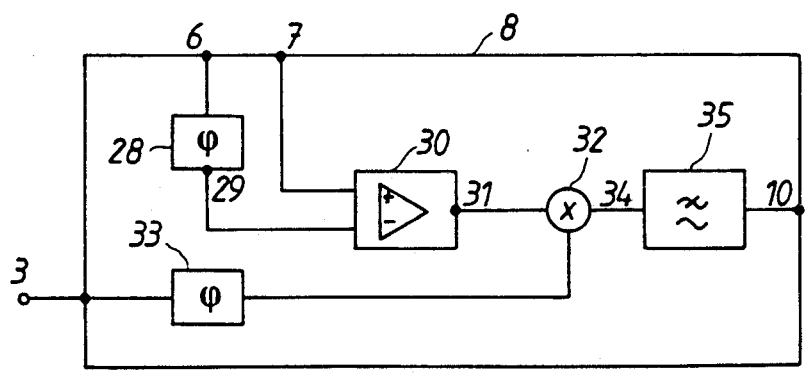
FIG. 7 shows an embodiment of the phase-sensitive detection of even harmonics in the block diagram according to FIGS. 2 and 3.

FIG. 7 shows an implementation of the phase-sensitive detector 8 of even harmonics, shown in FIGS. 2 and 3. The signal arriving at connection 6 is phase-shifted in a phase-shift circuit 28 and passed from the output 29 to a subtractor 30 where it is subtracted from the signal arriving at connection 7 and being proportional to the supply current. The signal level and phase position of the output 29 of the phase-shift circuit are to be adapted such that the signal on the output 31 of the subtractor contains as small a portion as possible with the same frequency as the magnetization of the transducer. The signal on the output of the subtractor is connected to the input of a phase-sensitive rectifier 32. The control signal to the phase-sensitive rectifier is obtained by phase-shifting the signal from the output 3 of the voltage source in a phase-shift circuit 33. The phase-shift is chosen such that the phase of the control signal corresponds to the phase of the second tone which arises in the signal on the output from the subtractor when the transducer is subjected to a static magnetic field. The signal on the output 34 from the phase-sensitive rectifier is finally low-pass filtered in a low-pass filter 35.

As previously described, it should be noted that it is not necessary for the function of the detector to subtract the fundamental tone from the voltage signal connected to input 6 and from the current signal connected to input 7, respectively. However, this method reduces the demands for ideality of the phase-sensitive rectifier 32.

Other solutions for implementing the demodulator are, of course, also possible.

In the solutions described above, the various functions have been realized as building blocks designed on the basis of analogue technique. However, there is, of course, nothing preventing realizing the same functions with the use of a digital signal processor.

Figure 8:
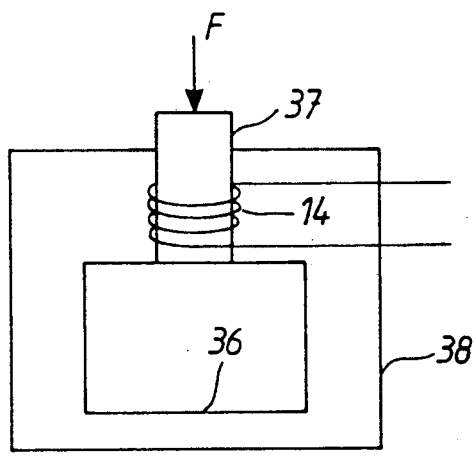
FIG. 8 shows the principle of applying a compensating winding for preventing static and/or quasi-static magnetic fields from disturbing a magnetoelastic force transducer.

FIG. 8 shows a force transducer 8 which is protected from a static and/or quasi-static magnetic field with the aid of a compensating winding 14. The force on the force transducer is applied by way of an end piece 37 which is also capable of conducting static magnetic fields into the transducer. To prevent this, the compensating winding is wound around the end piece. In addition, the transducer is suitably screened off with the aid of a shielding box 38 of highly permeable magnetic material. This protects the transducer from external magnetic fields which are directed across the direction of force. The screen also functions as flux closure yoke for the magnetic field generated by the compensating winding, which, in turn, reduces the current consumption of the second amplifier 13 according to FIG. 2.

Figure 9:
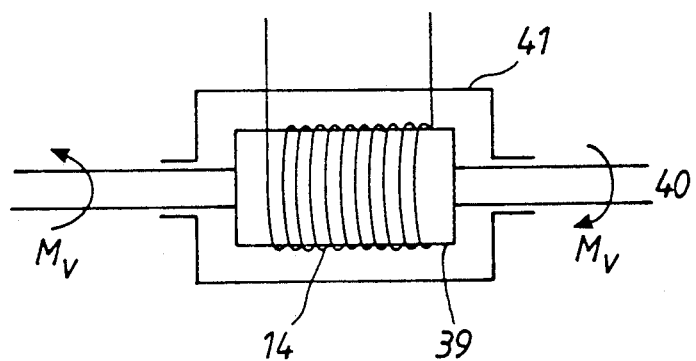
FIG. 9 shows the principle of applying a compensating winding for preventing static and/or quasi-static magnetic fields from disturbing a magnetoelastic torque transducer.

FIG. 9 shows how a torque transducer 39, with the aid of a compensating winding 14, may be protected from a static and/or quasi-static magnetic field which is introduced via a torque-loaded shaft 40. It is shown here that the compensating winding may be wound around the transducer itself instead of around the shaft. Also in this case, an external magnetic screen 41 may be used.

Figure 10:
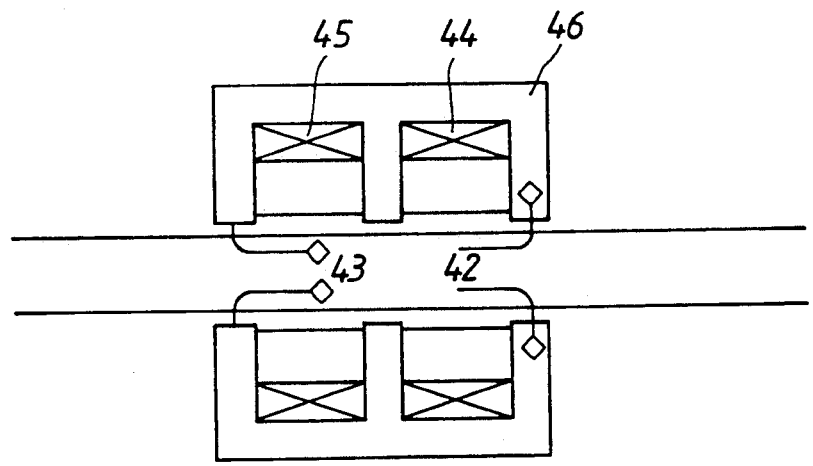
FIG. 10 shows how the compensation may be solved without extra windings according to FIG. 3, in one case when the direction of the expected disturbance of the magnetic field coincides with the direction of the magnetizing periodic field.

FIG. 10 shows an example of how to proceed with a torque transducer for compensation in accordance with the embodiment illustrated in FIG. 3. FIG. 10 shows, in cross section, the principle of a contactless torque transducer according to, for example, U.S. Pat. No. 4,760,745. In this transducer two measuring zones 42 and 43 are magnetized by a time-dependent periodic magnetic field which is generated by two excitation coils 44 and 45 which are concentric with and series-connected to the shaft. The flux is closed by a yoke 46 of highly permeable material. Since the magnetization coincides with the direction of the shaft, the compensating magnetic field may be generated by superimposing a direct current on the periodic exciting current, as indicated in FIG. 3.

We claim:

1. A method for detection of the disturbing static and quasi-static magnetic fields effects in measurement systems using force and torque transducers based on the magnetoelastic effect and including such a transducer magnetized by a symmetrical, periodic supply current, the Fourier representation of which comprises only a fundamental frequency and odd harmonics of the fundamental frequency, comprising the steps of:

generating from the transducer, when supplied with current, a first signal proportional to the flux in the transducer or the time rate of change of flux and providing said first signal to a first input of a phase-sensitive detector;

generating an output signal of said phase-sensitive detector proportional to the content of even harmonics in the Fourier representation of said first signal;

generating from said transducer, when supplied with a magnetization voltage, a second signal proportional to the supply current magnetizing the transducer and providing said second signal to the second input of said phase-sensitive detector;

generating an output signal of said phase-sensitive detector proportional to the content of even harmonics in the Fourier representation of said second signal; and detecting disturbing static and/or quasi-static magnetic fields when the output of the phase-sensitive detector is different from zero.

2. The method according to claim 1, further comprising the step of generating a static and/or quasi-static transducer magnetization directed in the opposite direction of the disturbing quasi-static magnetization.

3. The method according to claim 1, further comprising the step of generating from the excitation winding of said transducer in cooperation with the transducer exciting current a static and/or quasi-static magnetization in the opposite direction of the static and/or quasi-static magnetization.

4. A device for detection of the disturbing static and quasi-static magnetic fields effects in measurement systems using force and torque transducers based on the magnetoelastic effect and including such a transducer magnetized by a symmetrical, periodic supply current, the Fourier representation of which comprises only a fundamental frequency and odd harmonics of the fundamental frequency, comprising the steps of:

means for generating from the transducer, when supplied with current, a first signal proportional to the flux in the transducer or the time rate of change of flux and providing said first signal to a first input of a phase-sensitive detector;

means for generating an output signal of said phase-sensitive detector proportional to the content of even harmonics in the Fourier representation of said first signal;

means for generating from said transducer, when supplied with a magnetization voltage, a second signal proportional to the supply current magnetizing the transducer and providing said second signal to the second input of said phase-sensitive detector;

means for generating an output signal of said phase-sensitive detector proportional to the content of even harmonics in the Fourier representation of said second signal; and means for detecting disturbing static and/or quasi-static magnetic fields when the output of the phase-sensitive detector is different from zero.

5. The device according to claim 4, further comprising means for generating a static and/or quasi-static transducer magnetization directed in the opposite direction of the disturbing quasi-static magnetization.

6. The device according to claim 4, further comprising means for generating from the excitation winding of said transducer in cooperation with the transducer exciting current a static and/or quasi-static magnetization in the opposite direction of the static and/or quasi-static magnetization.

7. The device according to claim 4, further comprising transducer supply voltage means functioning as said first signal proportional to the time rate of change of the flux through said transducer.

8. The device according to claim 4, wherein the induced voltage in one or more measuring windings represents the signal proportional to the time rate of change of the flux through the transducer.

9. The device according to claim 4, further comprising a transducer supply voltage and an extra secondary winding of said transducer connected parallel to said supply voltage represents the signal proportional to the time rate of change of the flux through the transducer.

* * * * *